Patented Aug. 24, 1937

2,091,149

UNITED STATES PATENT OFFICE 2,091,149

METHOD OF MAKING MILK CONFECTION

Carrold A. Iverson, Ames, Iowa, assignor to Iowa State College Alumni Association, Incorporated, a corporation of Iowa No Drawing. Application February 6, 1936, Serial No. 62,628

2 Claims. (Cl. 99—134)

The object of my invention is to provide a milk and honey food confection,—to-wit, a food confection in plastic mass form, consisting of milk solids, unaltered in form, except for the removal of free water, and honey or invert sugar, the milk solids being substantially in excess of the sugar solids, the product being free from sandiness or grittiness due to lactose crystallization and free from bitter taste.

My invention consists in the product, which is hereinafter described and in the method of making it.

It has not been impossible to make milk and sugar confections heretofore, but the ingredients or the process or both have always been such that it was impossible to produce a plastic mass, which retained the milk solids unaltered in form and in high proportion, and which was really palatable as a confection as well as a food, and which was free from sandiness or grittiness, due to lactose crystallization and free from bitter taste.

It is well known that prolonged heating at high temperatures, incident for instance to candy manufacture, tends to carmelize the milk sugar and alter the milk solids. In candy of this kind, the value is largely due to the caramelized flavor and not to the presence of milk solids. Where milk containing sugar has had the water evaporated by stirring in a vacuum, the water can be removed, but there develops a sandy texture in the finished product if sucrose alone is used or a bitter flavor if glucose is added of itself or as a part of invert sugars.

Furthermore, the process is intermittent and slow.

I have discovered that if the proper proportions of the ingredients are used, and if a natural sugar such as honey is employed, and if the right process is used for evaporating the free water, the desired product above mentioned can be produced.

In the preparation of my product, I ascertain the solid content of the milk, add honey (or an invert sugar) and if desired coloring and flavoring material, such as chocolate, peppermint and so forth.

For illustration, I preferably start with a certain amount of milk, as for instance, 100 pounds, containing for example 12½ pounds of milk solids.

I preferably pasteurize the milk at 160° to 180° Fahrenheit, and next homogenize it. I have found in some instances that if the milk is not homogenized, the butterfat shows a tendency to fry out, while the produce is being dried, thus giving it an oily appearance.

The homogenized material is now cooled down to approximately 60° Fahrenheit. I then add honey or an invert sugar at the rate of 9 and 1/6 pounds of honey per 100 pounds of milk. Flavoring such as chocolate and a small amount of salt may be added to give a greater variety of flavors.

The free water is then evaporated from the mixture on roller drums.

I have by a long course of experiments determined that when the mixture is discharged upon the surface of the drums, and the drums are maintained at the right temperature, and the mixture is kept thereon for the right time, there will be formed a plastic mass, which can be removed from the drums by means of knives, and will then retain its plasticity and be wholly free from any unsatisfactory lactose crystallization and free from bitter taste.

It will, of course, be understood that the temperature and the time of exposure will vary according to the size of the drums and their speed, but upon drums of twenty-eight inch diameter, traveling at twelve revolutions per minute, I find that where the surfaces of the drums are maintained at a temperature of 270° Fahrenheit, the proper plastic mass will be formed before the drums have made a complete revolution.

If the temperature of the drums is too high, the product will become tough and hard and difficult to shape and cut soon after removal.

If the temperature is too low, the product will not be sufficiently dry to gather into plastic form.

It is well known that milk is a valuable food for humans, particularly for children. It is also generally recognized that while sugars and candies afford a source of quick energy, yet to include a large amount of them in the diets of children tends to crowd out of the diet essential dietary factors, which are present in milk.

My product includes a high milk content and therefore is especially valuable for children and also has the desired palatability.

The presence of the honey not only prevents the formation of "sandy" lactose crystals, but adds to the flavor of the product as well. It has been recognized that the use of a "natural sweet" such as honey, permits the child to know its "end point", and there is much less likelihood of the child overeating.

When this natural sweet honey is combined with milk in my product, as here set forth, an almost perfect product for children results.

It will, of course, be understood that the proportion of honey may vary to some extent, depending upon the steps of the process and upon the amount of milk, and the proportion of milk solids in the milk.

It has already been suggested that the steps in the process can be varied somewhat.

Once the object to be attained is known and the effectiveness of the use of the honey for the purpose is known, a careful experimentation will show the best proportion and the best process.

I claim as my invention:

1. A method of making a plastic mass food confection, comprising the mixing of milk, having a milk solid content of approximately 12½ pounds in 100 pounds of milk with approximately 11 pounds of invert sugar, the removal of the free water from the milk by exposing the mixture in a thin layer to a heat of approximately 270° Fahrenheit for approximately four seconds.

2. A method of making a plastic mass food confection, comprising the mixing of milk, having a milk solid content of approximately 12½ pounds in 100 pounds of milk with approximately 11 pounds of sugar, the removal of the free water from the milk by exposing the mixture in a thin layer to a heat of approximately 270° Fahrenheit for approximately four seconds.

CARROLD A. IVERSON.